(12) United States Patent
Cao et al.

(10) Patent No.: US 12,299,278 B2
(45) Date of Patent: May 13, 2025

(54) VARIABLE SIZED DATA CHUNKS WITH STRIPED ERASURE CODING

(71) Applicant: Dell Products L.P., Round Rock, TX (US)

(72) Inventors: Jiang Cao, Shanghai (CN); Kalyan C. Gunda, Bangalore (IN); Gary Jialei Wu, Shanghai (CN); Chark Wenshuai Yu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 52 days.

(21) Appl. No.: 18/058,077

(22) Filed: Nov. 22, 2022

(65) Prior Publication Data

US 2024/0168629 A1 May 23, 2024

(51) Int. Cl.
*G06F 3/06* (2006.01)
(52) U.S. Cl.
CPC .......... *G06F 3/0604* (2013.01); *G06F 3/0644* (2013.01); *G06F 3/0659* (2013.01); *G06F 3/0673* (2013.01)
(58) Field of Classification Search
CPC .... G06F 3/0604; G06F 3/0644; G06F 3/0659; G06F 3/0673
See application file for complete search history.

(56) References Cited

U.S. PATENT DOCUMENTS

| | | | |
|---|---|---|---|
| 11,023,318 B1 * | 6/2021 | Volkov | G06F 16/1805 |
| 11,360,699 B1 * | 6/2022 | Zhang | G06F 3/0619 |
| 11,385,806 B1 * | 7/2022 | Banerjee | G06F 3/0689 |
| 2018/0018235 A1 * | 1/2018 | Arslan | H03M 13/1177 |
| 2020/0348855 A1 * | 11/2020 | Vaknin | G06F 3/0608 |
| 2022/0269407 A1 * | 8/2022 | Wang | G06F 3/0608 |

* cited by examiner

*Primary Examiner* — Tasnima Matin
(74) *Attorney, Agent, or Firm* — Amin, Turocy & Watson, LLP

(57) ABSTRACT

A system can determine to write a data object to a storage system that implements an append-only write policy to data chunks. The system can divide a data chunk of the data chunks into a number of data segments. The system can divide respective data segments of the number of data segments into respective stripes. The system can write a first portion of data of the data object to first stripes of the respective stripes. The system can, after writing the first portion of data of the data object to the first stripes, and independently of writing a second portion of data of the data object to second stripes of the respective stripes, determine erasure coding values, and write respective erasure coding values of the erasure coding values to respective erasure coding stripes that are separate from the respective stripes, The system can store the data chunk.

20 Claims, 12 Drawing Sheets

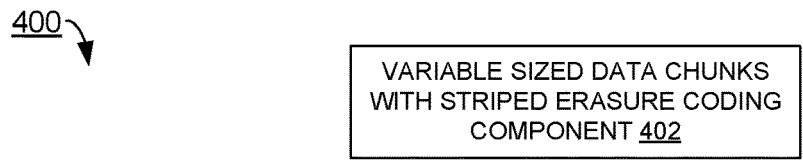
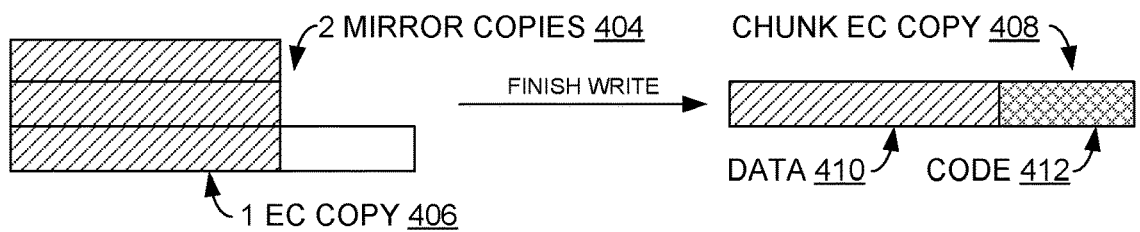
FIG. 4

900

(902)

↓

DETERMINING TO WRITE A DATA OBJECT TO A STORAGE SYSTEM THAT IMPLEMENTS AN APPEND-ONLY WRITE POLICY TO DATA CHUNKS 904

↓

DIVIDING RESPECTIVE DATA SEGMENTS OF THE NUMBER OF DATA SEGMENTS INTO RESPECTIVE STRIPES 908

↓

WRITING A FIRST PORTION OF DATA OF THE DATA OBJECT TO FIRST STRIPES OF THE RESPECTIVE STRIPES 910

↓

AFTER WRITING THE FIRST PORTION OF DATA OF THE DATA OBJECT TO THE FIRST STRIPES, AND INDEPENDENTLY OF WRITING A SECOND PORTION OF DATA OF THE DATA OBJECT TO SECOND STRIPES OF THE RESPECTIVE STRIPES, DETERMINING ERASURE CODING VALUES, WRITING RESPECTIVE ERASURE CODING VALUES OF THE ERASURE CODING VALUES TO RESPECTIVE ERASURE CODING STRIPES THAT ARE SEPARATE FROM THE RESPECTIVE STRIPES 912

↓

STORING THE DATA CHUNK 914

DIVIDING A DATA CHUNK INTO DATA SEGMENTS 1104

↓

DIVIDING THE DATA SEGMENTS INTO RESPECTIVE STRIPES 1106

↓

AFTER WRITING A FIRST PORTION OF DATA OF A DATA OBJECT TO FIRST STRIPES OF THE RESPECTIVE STRIPES, AND INDEPENDENTLY OF WRITING A SECOND PORTION OF DATA OF THE DATA OBJECT TO SECOND STRIPES OF THE RESPECTIVE STRIPES, DETERMINING ERASURE CODING VALUES, AND WRITING THE ERASURE CODING VALUES TO RESPECTIVE ERASURE CODING STRIPES 1108

VARIABLE SIZED DATA CHUNKS WITH STRIPED ERASURE CODING

BACKGROUND

Computer storage systems can comprise elastic storage systems that can expand and reduce capacity made available to a user as that user's storage needs change.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to write a data object to a storage system that implements an append-only write policy to data chunks. The system can divide a data chunk of the data chunks into a number of data segments. The system can divide respective data segments of the number of data segments into respective stripes. The system can write a first portion of data of the data object to first stripes of the respective stripes. The system can, after writing the first portion of data of the data object to the first stripes, and independently of writing a second portion of data of the data object to second stripes of the respective stripes, determine erasure coding values, and write respective erasure coding values of the erasure coding values to respective erasure coding stripes that are separate from the respective stripes, The system can store the data chunk.

An example method can comprise dividing, by a system comprising a processor, a data chunk into a number of data segments. The method can further comprise dividing, by the system, respective data segments of the number of data segments into respective stripes. The method can further comprise writing, by the system, a first portion of data of a data object to first stripes of the respective stripes. The method can further comprise, after writing the first portion of data of the data object to the first stripes of the respective stripes, and independently of writing a second portion of data of the data object to second stripes of the respective stripes, determining, by the system, erasure coding values, and writing, by the system, respective erasure coding values of the erasure coding values to respective erasure coding stripes.

An example non-transitory computer-readable medium can comprise instructions that, in response to execution, cause a system comprising a processor to perform operations. These operations can comprise dividing a data chunk into data segments. These operations can further comprise dividing the data segments into respective stripes. These operations can further comprise, after writing a first portion of data of a data object to first stripes of the respective stripes, and independently of writing a second portion of data of the data object to second stripes of the respective stripes, determining erasure coding values, and writing the erasure coding values to respective erasure coding stripes.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates another example system architecture that can facilitate variable sized data chunks with striped erasure coding, in accordance with an embodiment of this disclosure;

FIG. 9 illustrates an example process flow that can facilitate variable sized data chunks with striped erasure coding, in accordance with an embodiment of this disclosure;

FIG. 11 illustrates another example process flow that can facilitate variable sized data chunks with striped erasure coding, in accordance with an embodiment of this disclosure;

DETAILED DESCRIPTION

Overview

Some elastic storage systems can write data objects (where a data object can be written to a flat address space, and viewed in contrast to file storage where data is written as files to a hierarchy of directories) to multiple fixed-size type-I chunks. This approach can increase a complexity of a garbage collection (GC) process after deleting an object. Additionally, approaches that write a data object as a three-mirrors copy and then change storage of the data object to a one erasure coding (EC) copy can also be inefficient. There can be storage systems that utilize type-II chunks to optimize for objects larger than 128 megabytes (MB), but in some scenarios this threshold size can be so big that the storage system has less flexibility.

The present techniques can be implemented to facilitate type-III chunks with support for stripe erasure coding and variable size. It can be that an object that is close to or beyond a Stripe-EC-Unit size (e.g., 4 MB) can be written to one or more type-III chunks. This can result in one object mapping to one type-III chunk, which can simplify a garbage collection process, and reduce a threshold of write erasure coding copies from 128 MB to 4 MB.

An example data storage system can store data as chunks, which can be logical data blocks that have a 128 MB fixed size and support append-only write (where new data is appended to a chunk until the chunk is full; and the data is garbage collected at the chunk level rather than in portions of chunks). A logical chunk can comprise physical disk blocks.

Example Architectures

Figure 1:
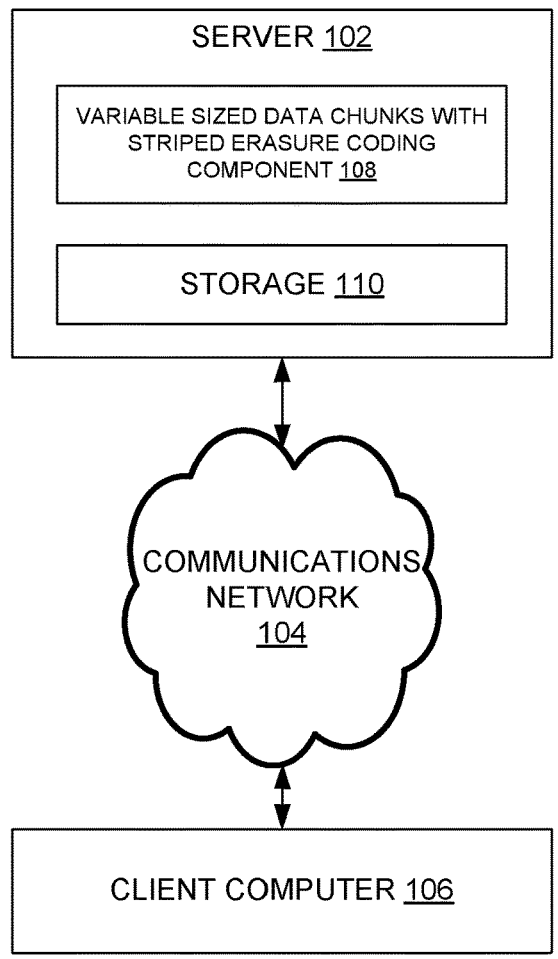
FIG. 1 illustrates an example system architecture that can facilitate variable sized data chunks with striped erasure coding, in accordance with an embodiment of this disclosure.

FIG. 1 illustrates an example system architecture 100 that can facilitate variable sized data chunks with striped erasure coding, in accordance with an embodiment of this disclosure.

System architecture 100 comprises server 102, communications network 104, and client computer 106. In turn, server 102 comprises variable sized data chunks with striped erasure coding component 108, and storage 110.

Figure 12:
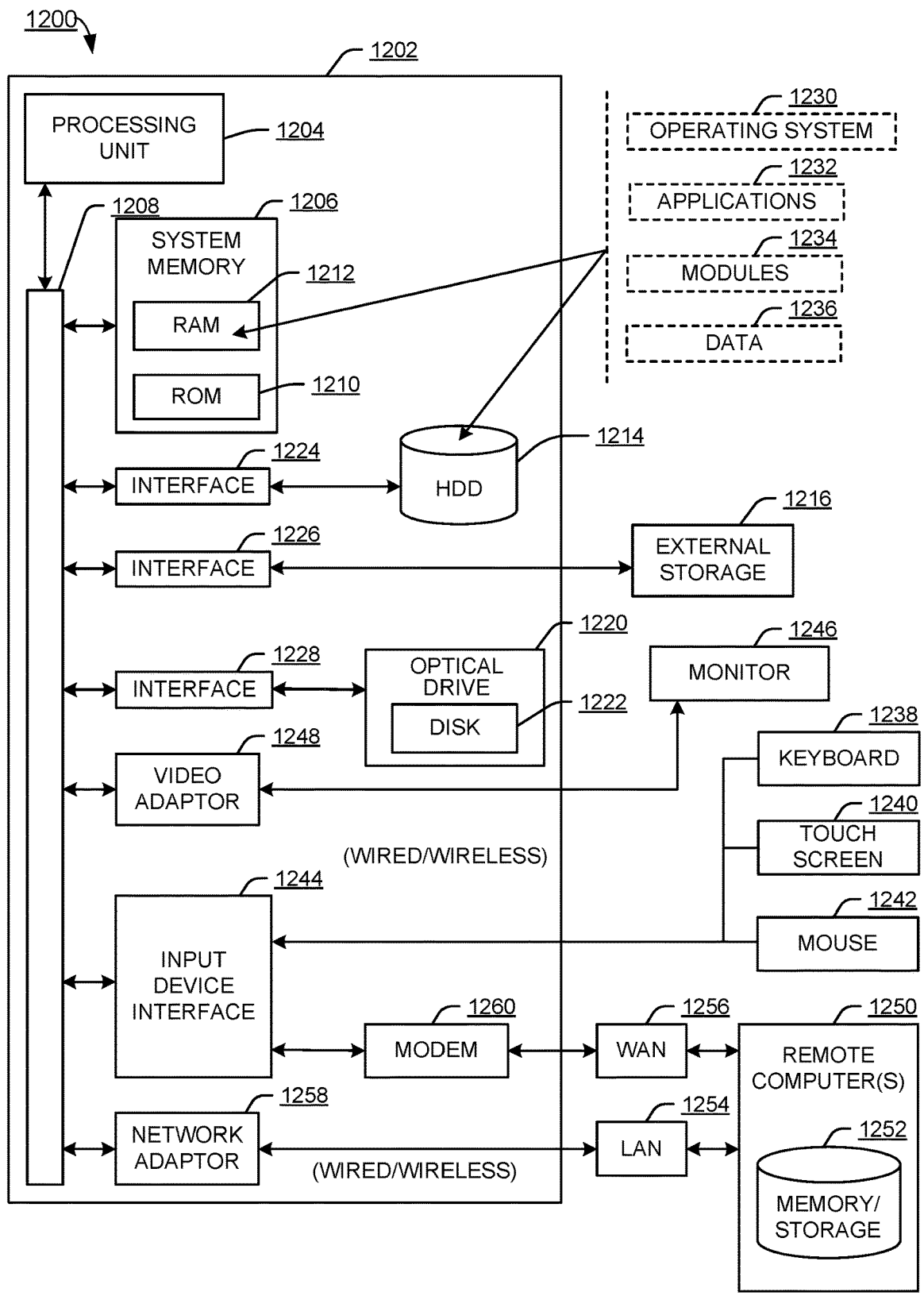
FIG. 12 illustrates an example block diagram of a computer operable to execute an embodiment of this disclosure.

Each of server 102 and/or client computer 106 can be implemented with part(s) of computing environment 1200 of FIG. 12. Communications network 104 can comprise a computer communications network, such as the Internet.

Variable sized data chunks with striped erasure coding component 108 can facilitate elastic storage by storing data in storage 110 on behalf of client computer 106. Client computer 106 can data to server 102 via communications network 104. Variable sized data chunks with striped erasure coding component 108 can then store this data in storage 110 using a variety of data protection techniques, such as those illustrated with respect to FIGS. 2-8.

Figure 10:
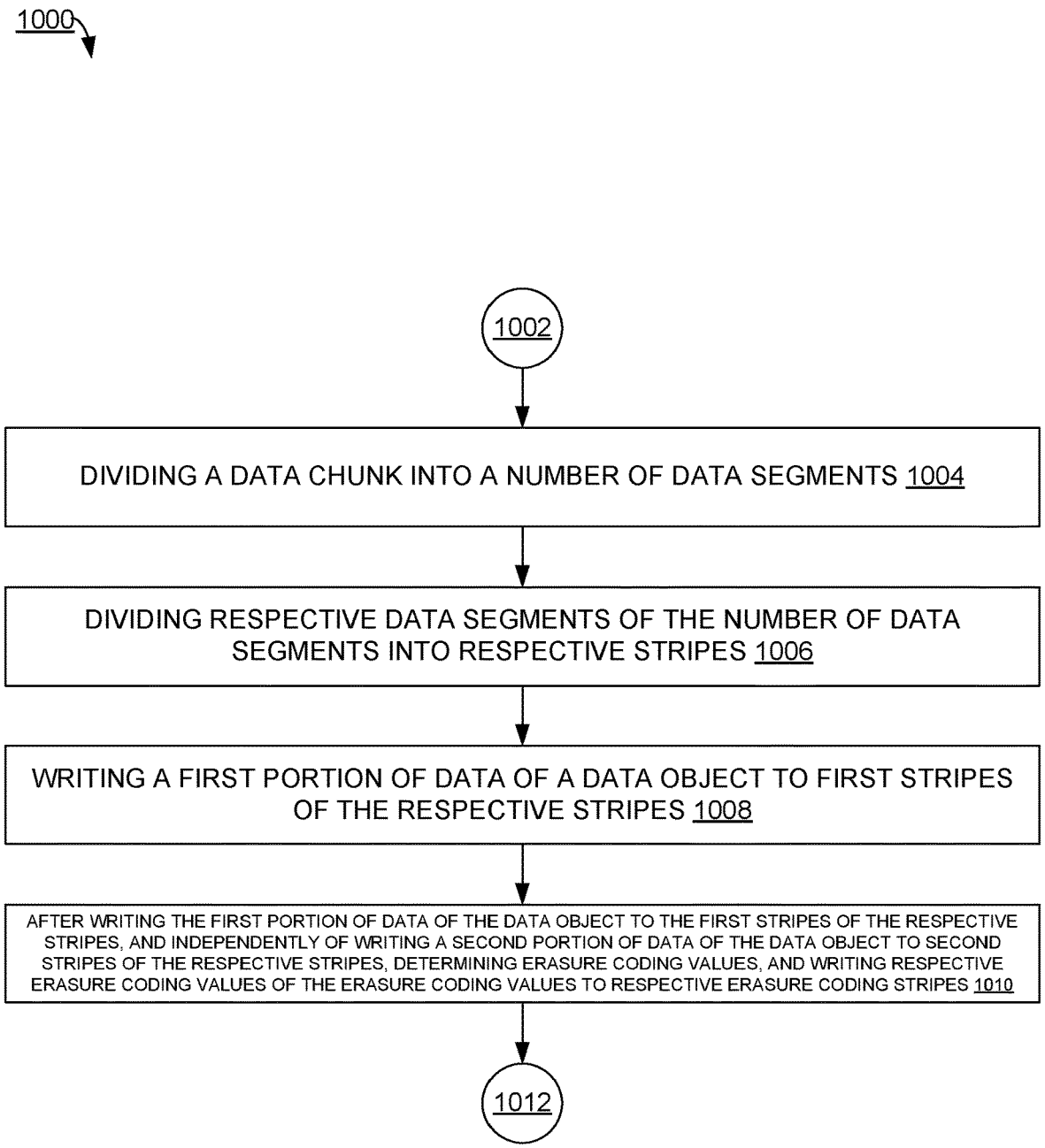
FIG. 10 illustrates another example process flow that can facilitate variable sized data chunks with striped erasure coding, in accordance with an embodiment of this disclosure.

In some examples, variable sized data chunks with striped erasure coding component 108 can implement part(s) of the process flows of FIGS. 9-11 to implement variable sized data chunks with striped erasure coding.

It can be appreciated that system architecture 100 is one example system architecture for variable sized data chunks with striped erasure coding, and that there can be other system architectures that facilitate variable sized data chunks with striped erasure coding.

Figure 2:
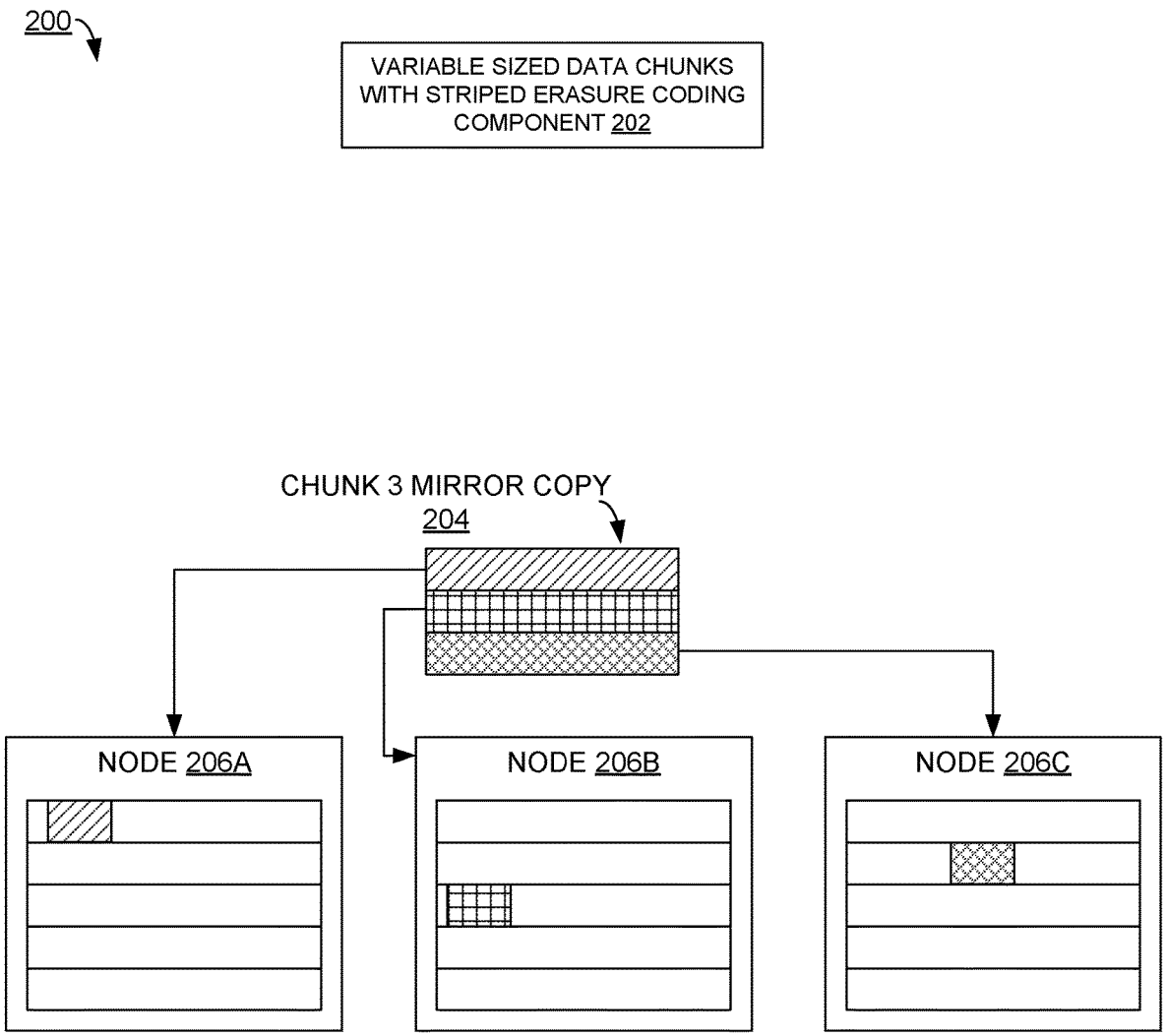
FIG. 2 illustrates another example system architecture that can facilitate variable sized data chunks with striped erasure coding, in accordance with an embodiment of this disclosure.

FIG. 2 illustrates another example system architecture 200 that can facilitate variable sized data chunks with striped erasure coding, in accordance with an embodiment of this disclosure. In some examples, part(s) of system architecture 200 can be implemented with part(s) of system architecture 100 of FIG. 1 to facilitate variable sized data chunks with striped erasure coding.

System architecture 200 comprises variable sized data chunks with striped erasure coding component 202 (which can be similar to variable sized data chunks with striped erasure coding component 108 of FIG. 1), chunk 3 mirror copy 204, node 206A, node 206B, and node 206C.

An example data storage system can store data as chunks (e.g., chunk 3 mirror copy 204), which can be logical data blocks that have a 128 MB fixed size and support append-only write (where new data is appended to a chunk until the chunk is full; and the data is garbage collected at the chunk level rather than in portions of chunks). A logical chunk can comprise physical disk blocks (e.g., physical disk blocks of node 206A, node 206B, and/or node 206C).

Figure 3:
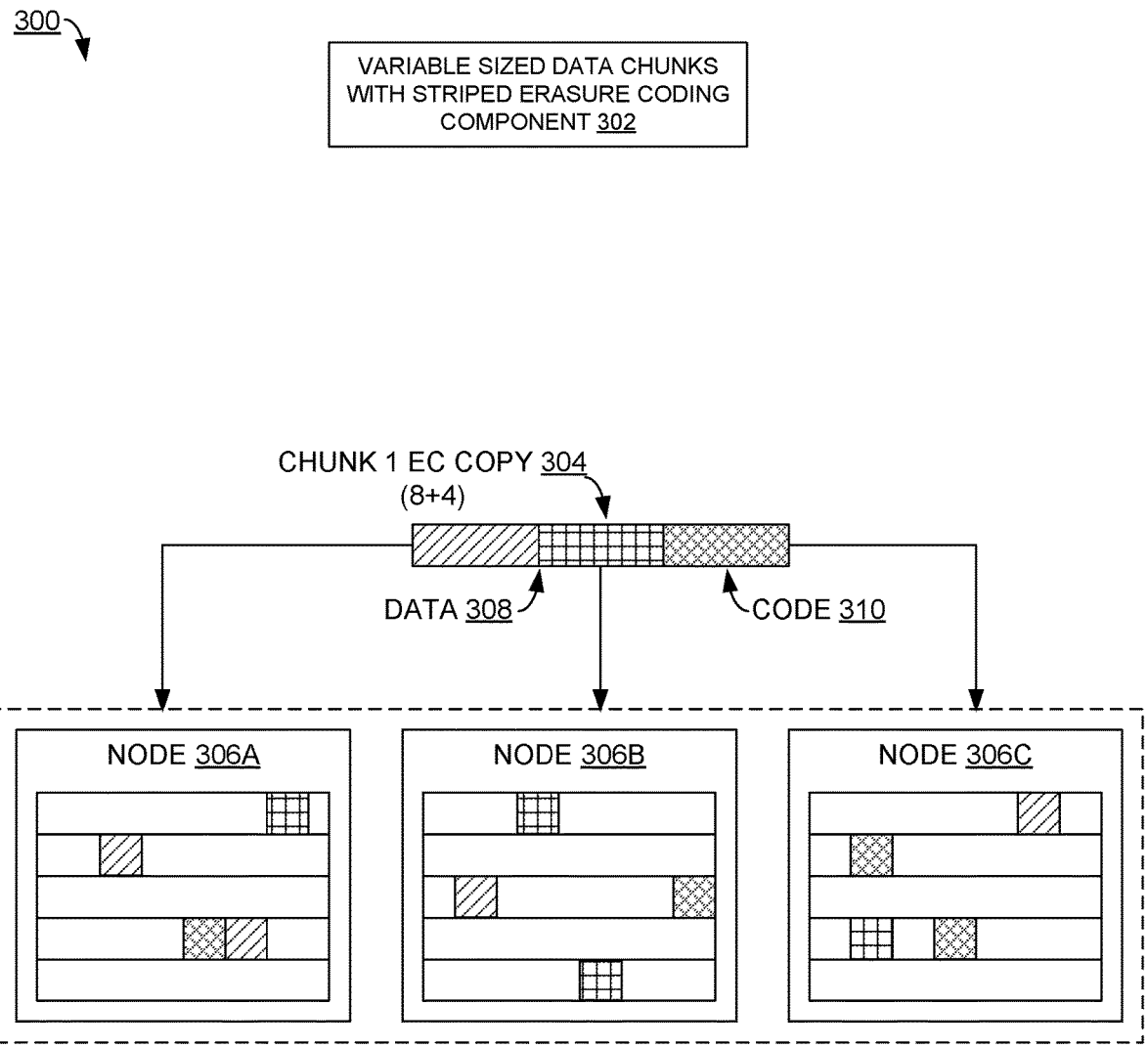
FIG. 3 illustrates another example system architecture that can facilitate variable sized data chunks with striped erasure coding, in accordance with an embodiment of this disclosure.

In some examples, a chunk can have either 3 mirror copies (as in system architecture 200) or 1 erasure coding copy (as in system architecture 300 of FIG. 3). With an erasure coding copy, an 8+4 EC scheme can indicate that there are 8 data segments and 4 corresponding code segments.

In system architecture 200, data from chunk 3 mirror copy 204 is stored at various parts in node 206A, node 206B, and node 206C. For a mirror copy in system architecture 200, data within each node is stored as a continuous block. Node 206A, node 206B, and node 206C can each be computer nodes that are configured to store data as physical blocks on disk.

FIG. 3 illustrates another example system architecture 300 that can facilitate variable sized data chunks with striped erasure coding, in accordance with an embodiment of this disclosure. In some examples, part(s) of system architecture 200 can be implemented with part(s) of system architecture 100 of FIG. 1 to facilitate variable sized data chunks with striped erasure coding.

System architecture 300 comprises variable sized data chunks with striped erasure coding component 302 (which can be similar to variable sized data chunks with striped erasure coding component 108 of FIG. 1), chunk EC copy 304, node 306A, node 306B, and node 306C (which can be similar to node 206A, node 206B, and node 206C of FIG. 2, respectively). In turn, chunk EC copy 304 comprises data 308 and code 310. With an erasure coding copy as in chunk EC copy 304, an 8+4 EC scheme can indicate that there are 8 data segments (e.g., data 308) and 4 corresponding erasure code segments (e.g., code 310). In system architecture 300, data from chunk EC copy 304 can be split into multiple (e.g., 12 pieces) and distributed across the nodes. That is, in some examples, it can be that there is not a need to put the first four continuous parts of chunk EC copy 304 on one node. In system architecture 300, data from chunk EC copy 304 is stored at various parts in node 306A, node 306B, and node 306C.

FIG. 4 illustrates another example system architecture 400 that can facilitate variable sized data chunks with striped erasure coding, in accordance with an embodiment of this disclosure. In some examples, part(s) of system architecture 200 can be implemented with part(s) of system architecture 100 of FIG. 1 to facilitate variable sized data chunks with striped erasure coding.

System architecture 400 comprises variable sized data chunks with striped erasure coding component 402 (which can be similar to variable sized data chunks with striped erasure coding component 108 of FIG. 1), 2 mirror copies 404, 1 EC copy 406, and chunk EC copy 408. In turn, chunk EC copy 408 comprises data 410 and code 412.

2 mirror copies 404 and 1 EC copy 406 can together be similar to chunk 3 mirror copy 204 of FIG. 2. Chunk EC copy 408 can be similar to chunk EC copy 304 of FIG. 3. In system architecture 400, data is originally stored as 2 mirror copies 404 and 1 EC copy 406, and then when a write is finished that data can be stored as chunk EC copy 408.

That is, in some examples, data can be stored in a type-I chunk as 2 mirror copies plus 1 EC copy (e.g., 2 mirror copies 404 and 1 EC copy 406). The data can be written to 2 mirror disk blocks and data segments of an EC copy. After the chunk is filled and the code segments of the EC copy are written (e.g., code 412), the 2 mirror blocks can be deleted. A purpose of doing this can be to provide data protection during writing and saving disk space after building EC protection on the data.

Figure 5:
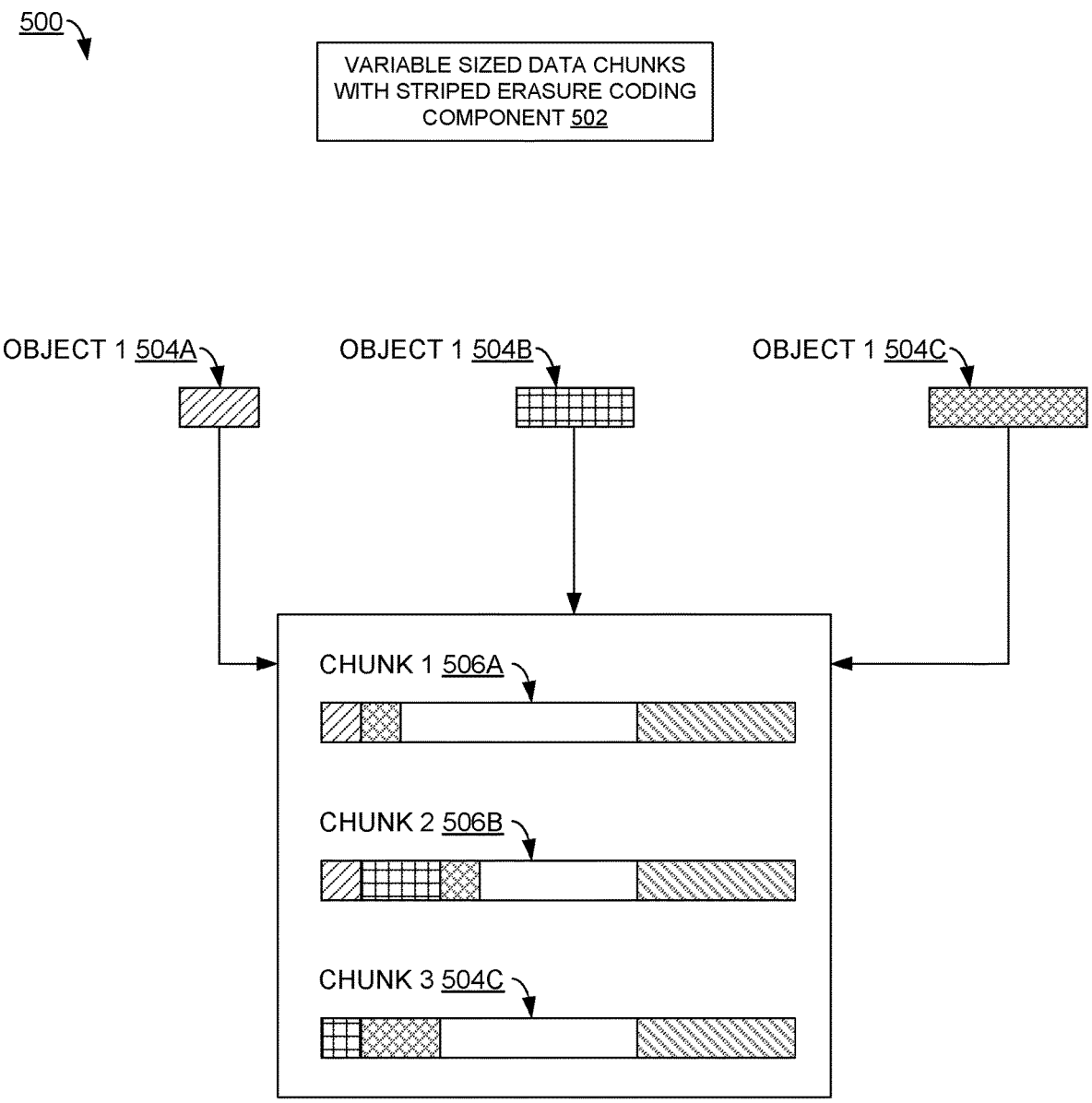
FIG. 5 illustrates another example system architecture that can facilitate variable sized data chunks with striped erasure coding, in accordance with an embodiment of this disclosure.

FIG. 5 illustrates another example system architecture 500 that can facilitate variable sized data chunks with striped erasure coding, in accordance with an embodiment of this disclosure. In some examples, part(s) of system architecture 200 can be implemented with part(s) of system architecture 100 of FIG. 1 to facilitate variable sized data chunks with striped erasure coding.

System architecture 500 comprises variable sized data chunks with striped erasure coding component 502 (which can be similar to variable sized data chunks with striped erasure coding component 108 of FIG. 1), object 1 504A, object 2 504B, object 3 504C, chunk 1 506A, chunk 2 506B, and chunk 3 506C.

A type-I chunk (e.g., one of chunk 1 506A, chunk 2 506B, and chunk 3 506C) can be shared by multiple objects (e.g., object 1 504A, object 2 504B, and object 3 504C). It can be that objects are split into blocks with a maximum size of 2 MB, and then written to different type-I chunks. A relationship of objects to type-I chunks can be m:n. That is, m objects can be written to n chunks. A benefit of this approach can be that a limited number of active type-I chunks can be used to support multiple ongoing writing objects.

An issue can occur when considering deleting objects in the above scenarios of FIGS. 2-5. It can be that a granularity of disk space reclamation is a chunk. It can be that disk blocks of chunks can be freed if all objects in the chunk are deleted (e.g., logically deleted, where the user has indicated that the object can be deleted, though the object is still physically stored on disk), or where leftover data in a candidate chunk is copied to a new chunk, and the candidate chunk is then freed for garbage collection. These approaches can require extra effort to manage and persist chunk reverse references. After deleting an object belonging to a type-I chunk, a reference count to that chunk can be decreased, but it can be that the corresponding disk space cannot be reclaimed immediately. Rather, after an unpredictable amount of time and a complex background process, the disk space can be reclaimed and reused by new chunks.

Another issue with type-I chunks can involve writing three mirrors of the data while creating object. While storage of the object can be optimized to use 1 EC copy to reduce disk space usage later, writing 3 mirror copies during creation can give extra overhead on a network and disks, which can reduce a maximum write bandwidth of a storage system such as an elastic storage system.

In a case of type-II chunks, one EC copy can be used to mitigate against drawbacks with type-I chunks. When an object is larger than a 128 MB chunk size, writing data can directed to an EC copy. It can be that one or more type-II chunks belongs to just one object. When deleting that object, the whole type-II chunk can be reclaimed, and the corresponding disk space can be reused for a new chunk soon because all other object usage on the chunk is removed. In some examples, with an EC 8+4 scheme, writing to type-II chunks can experience 1.5 times the bandwidth as compared to type-I chunks.

In some examples, there can be drawbacks to using type-II chunks. One drawback can be that only objects larger than 128 MB can be written to a type-II chunk (e.g., larger than the size of a type-II chunk), but 128 MB is not a small size, so many objects are smaller than that. Another drawback can be that objects can often have a variable size rather than a size that is the same as the size of a chunk, or an even multiple of the chunk size. That can indicate that part of the data object is left over and does not fill a type-II chunk. In some examples, the leftover part can be written to another type-II chunk, though this can waste a nontrivial amount of disk space. In another example, the leftover amount can be written to type-I chunks. In some examples, ⅙ of a type-II chunk size can be used as the threshold to decide whether to write the leftover part to a type-II chunk (where the leftover part is at least as large as ⅙ of the type-II chunk size) or to write to one or more type-I chunks (where the leftover part is smaller than ⅙ of the type-II chunk size).

Figure 6:
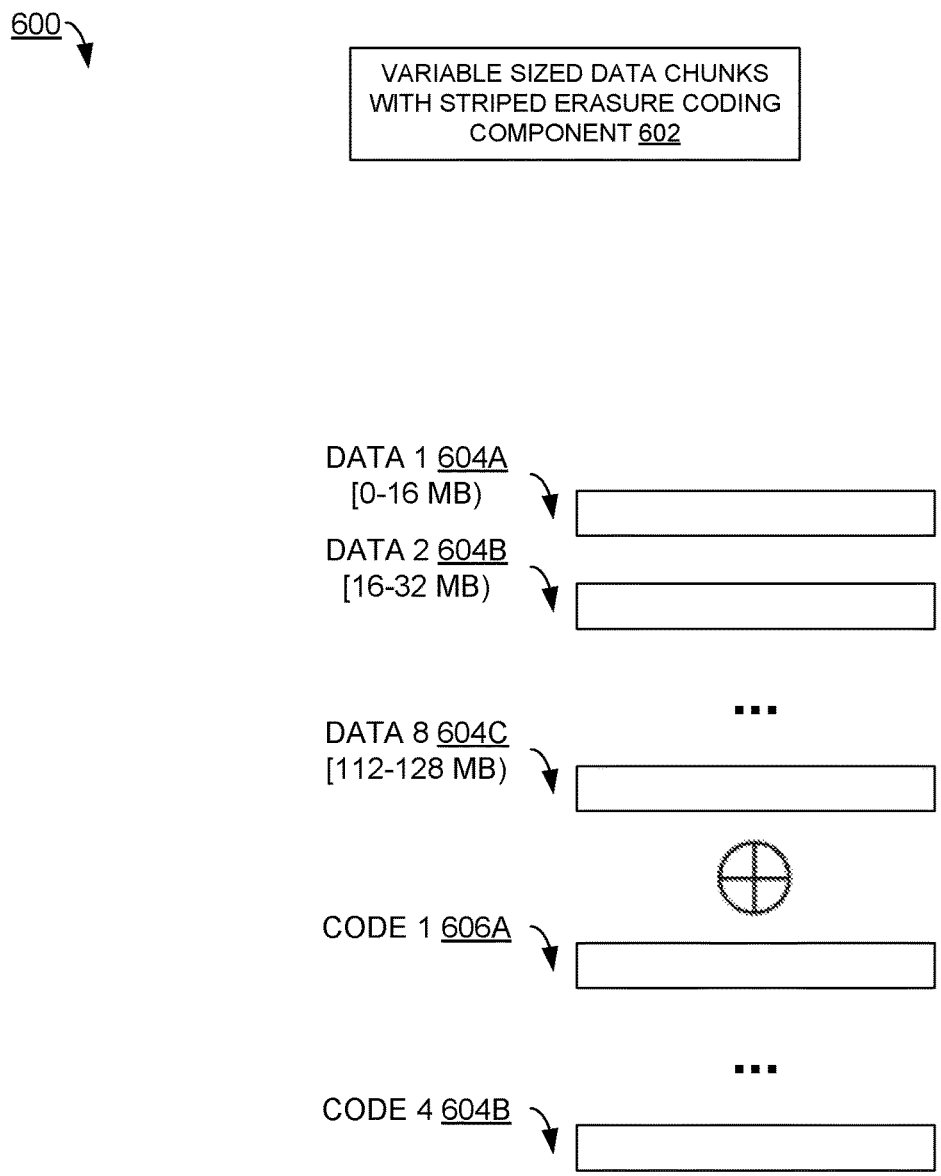
FIG. 6 illustrates another example system architecture that can facilitate variable sized data chunks with striped erasure coding, in accordance with an embodiment of this disclosure.

FIG. 6 illustrates another example system architecture 600 that can facilitate variable sized data chunks with striped erasure coding, in accordance with an embodiment of this disclosure. In some examples, part(s) of system architecture 200 can be implemented with part(s) of system architecture 100 of FIG. 1 to facilitate variable sized data chunks with striped erasure coding.

System architecture 600 comprises variable sized data chunks with striped erasure coding component 602 (which can be similar to variable sized data chunks with striped erasure coding component 108 of FIG. 1), data 1 604A, data 2 604B, data 8 604C, code 1 606A, and code 4 606B. The example of system architecture 600 uses an 8+4 EC scheme.

Some examples can be implemented with a preference to writing a whole object to un-shared chunks. In some examples, it can be better to directly write to an EC copy chunk in terms of performance. Given these considerations, the present techniques can be implemented to facilitate a type-III chunk that uses stripe EC and supports a variable chunk size to achieve a target.

Consider again an example of writing data to a 128 MB type-II chunk with an 8+4 EC scheme. With a type-II chunk, object data can be written to 16 MB data segments continuously, from segment 1 to 8. These data segments can include data 1 604A, data 2 604B, and data 8 604C. After writing all data segments, the four code segments can be determined and written. These code segments can include code 1 606A and code 4 606B.

Figure 7:
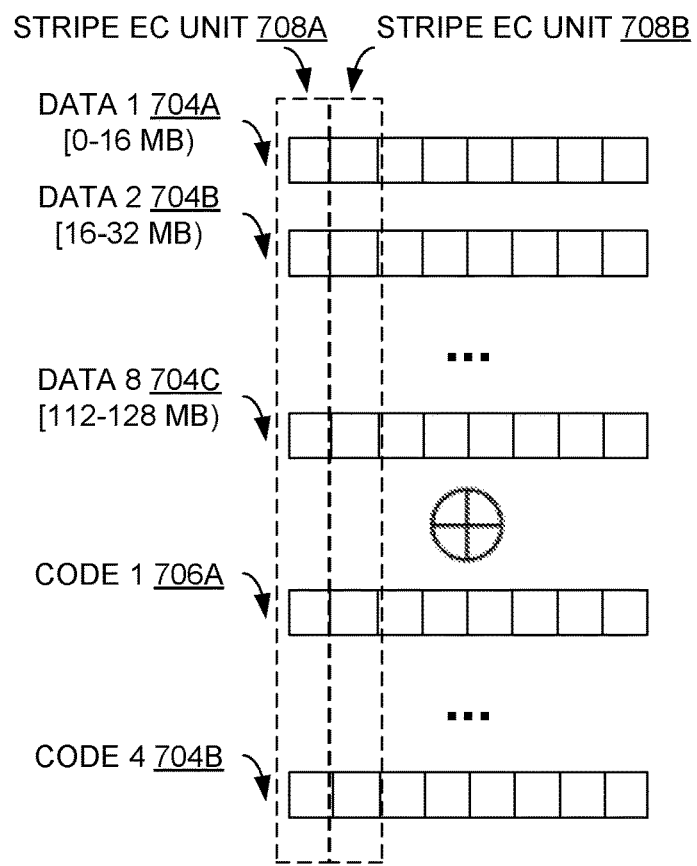
FIG. 7 illustrates another example system architecture that can facilitate variable sized data chunks with striped erasure coding, in accordance with an embodiment of this disclosure.

FIG. 7 illustrates another example system architecture 700 that can facilitate variable sized data chunks with striped erasure coding, in accordance with an embodiment of this disclosure. In some examples, part(s) of system architecture 200 can be implemented with part(s) of system architecture 100 of FIG. 1 to facilitate variable sized data chunks with striped erasure coding.

System architecture 700 comprises variable sized data chunks with striped erasure coding component 702 (which can be similar to variable sized data chunks with striped erasure coding component 108 of FIG. 1), data 1 704A, data 2 704B, data 8 704C, code 1 706A, code 4 706B, stripe EC unit 708A, and stripe EC unit 708B. The example of system architecture 700 uses an 8+4 EC scheme.

In contrast with system architecture 600 of FIG. 6, unlike continuing to write data on a chunk, each 16 MB segment block can be split into a smaller stripe (e.g., 512 kilobytes (KB). In this example, stripe-1 is first written in data 1 704A, then stripe 2 in data 2 704B, etc. After finishing writing stripes in all data segments, stripes in code segments (e.g., in code 1 706A, and code 4 706B) can be determined and written.

In system architecture 700 data in one stripe EC unit can be written before moving on to writing data to another stripe EC unit. That is, data in each data segment of stripe EC unit 708A can be written before writing data in stripe EC unit 708B.

This approach can be referred to as "stripe EC." By using a stripe EC approach, an amount of data doing EC can change from a larger chunk size to a "number of EC data segments * stripe size" size. Using an 8+4 EC scheme with a 512 KB stripe size, a stripe EC unit can contain 8 512 KB data stripes and 4 512 KB code stripes. For one 100 MB object, it can be that 25 stripe EC units are used. In some examples, it can be that the size of a chunk is not used in determining a stripe EC unit size.

Within stripe EC unit 708A, data 1 704A can store data from [0-512 KB), data 2 704B can store data from [512 KB-1,024 KB), and data 8 704C can store data from [3,584 KB-4,906 KB). Then, within stripe EC unit 708B, data 1 704A can store data from [4,096 KB-4,608 KB), data 2 704B can store data from [4,608 KB-5,120 KB), and data 8 704C can store data from 7,680 KB-8,192 KB).

Figure 8:
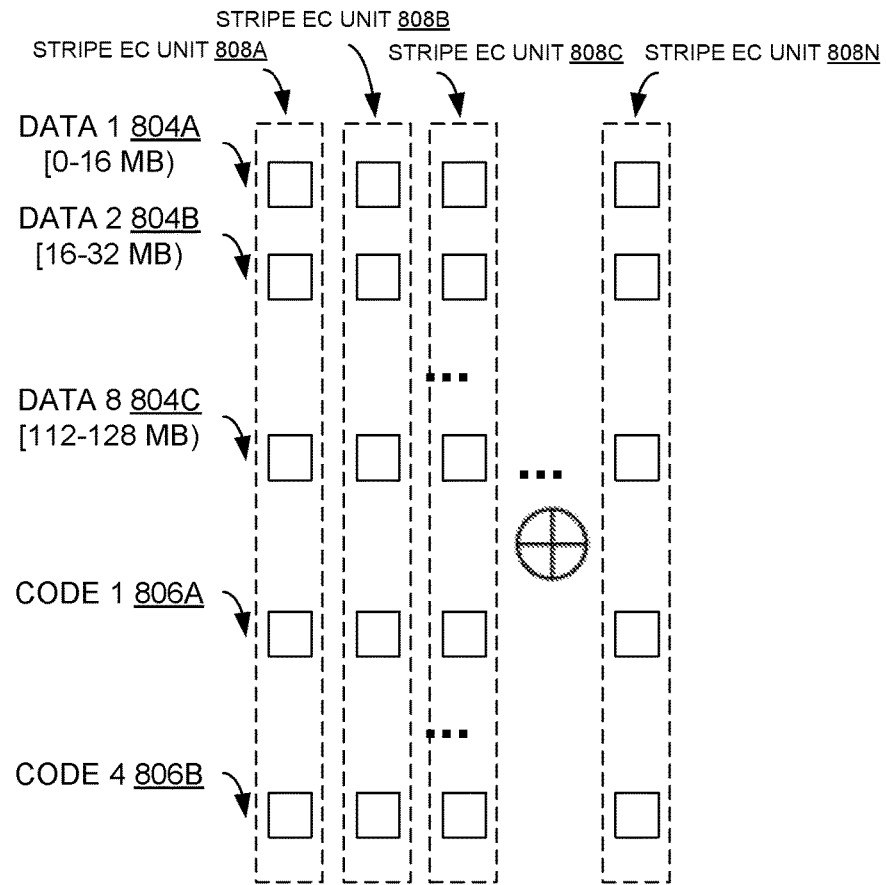
FIG. 8 illustrates another example system architecture that can facilitate variable sized data chunks with striped erasure coding, in accordance with an embodiment of this disclosure.

FIG. 8 illustrates another example system architecture 800 that can facilitate variable sized data chunks with striped erasure coding, in accordance with an embodiment of this disclosure. In some examples, part(s) of system architecture 200 can be implemented with part(s) of system architecture 100 of FIG. 1 to facilitate variable sized data chunks with striped erasure coding.

System architecture 800 comprises variable sized data chunks with striped erasure coding component 802 (which can be similar to variable sized data chunks with striped erasure coding component 108 of FIG. 1), data 1 804A, data 2 804B, data 8 804C, code 1 806A, code 4 806B, stripe EC unit 808A, stripe EC unit 808B, stripe EC unit 808C, and stripe EC unit 808N. The example of system architecture 800 uses an 8+4 EC scheme.

In the example of system architecture 800, one object can be written to one chunk. The object can by split by the stripe size, and written as multiple stripe EC units. A chunk size can be determined by the number of stripe EC units. It can be that a 4 MB object writes to one stripe EC unit, and a 1 gigabyte (GB) object writes to 256 stripe EC units.

It can be that an object that has a size that is close to or larger than a stripe EC unit data size can be written to a type-III chunk. In some scenarios, the following advantages can be experienced from this approach. Disk blocks can be freed immediately after deleting an object, so there is not an additional garbage collection flow required. EC recovery can be performed to rebuild the data when encountering data corruption; stripe EC can mean that less resources are used for an EC recovery job, or more parallel EC recovery jobs can be supported at a system level as compared with prior approaches. Different stripes can be distributed on different physical disks; data can be written and read in parallel from physical disks, which can improve a speed of object input/ output (I/O) as compared with prior approaches.

In some examples, a fixed EC stripe size can be selected to address disk fragmentation issues. Some prior storage products can support variable sized objects with a same EC scheme. These prior approaches can write variable sized EC segments to a file system. This can push a disk fragmentation issue to a low-level filesystem. An elastic storage system according to the present techniques can manage the physical disk space by itself, which can benefit from a fixed disk block size is. In some examples, the larger a disk size is, the less pressure and overhead on metadata. Another factor that can affect a disk block size can be a balance of I/O numbers and I/O size. It can be that a 512 KB stripe size is a feasible size for both hard disks and flash disks. Where a system uses only one stripe size disk block, it can be that fragmentation is not a problem after larger mirror copy chunk support composite of continuous and un-continuous stripe size disk blocks.

In the present techniques, tail object parts can be addressed as follows. It can be that the last part of an object is smaller than a stripe EC unit data size. Continuing writing a left part to the stripe EC unit can waste some space. In some examples, the small leftover part can be written to shared type-I chunks, where a threshold of use of shared type-I chunks can be reduced significantly as compared with prior approaches.

The present techniques can be implemented to facilitate an EC type-III chunk, which can support both stripe EC and variable size. With a default 512 KB stripe size, an object close to or beyond 4 MB can write to type-III chunks directly as an EC copy, which can improve a write efficiency of a storage system. In these examples, it can be that one object writes to one type-III chunk that supports variable size, and this can simplify a garbage collection process when deleting the object, disk space can be reclaimed immediately after a type-III chunk is deleted.

Example Process Flows

FIG. 9 illustrates an example process flow 900 that can facilitate variable sized data chunks with striped erasure coding, in accordance with an embodiment of this disclosure. In some examples, one or more embodiments of process flow 900 can be implemented by variable sized data chunks with striped erasure coding component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1000 of FIG. 10, and/or process flow 1100 of FIG. 11.

Process flow 900 begins with 902, and moves to operation 904. Operation 904 depicts determining to write a data object to a storage system that implements an append-only write policy to data chunks. In some examples, operation 904 can be implemented by variable sized data chunks with striped erasure coding component 108 of FIG. 1 in response to receiving a request from client computer 106 to write a data object to storage 110.

In some examples, respective data chunks of the data chunks have non-uniform sizes. That is, type-III chunks as described herein can be of a variable size.

In some examples, the number of data segments is a first number, and operation 904 comprises selecting a second number of the respective stripes based on a first size of the data object, and selecting a second size for the data chunk based on the second number of the respective stripes and a third size of the respective stripes. That is, chunk size can be decided by a number of stripe EC units being used to store a data object.

In some examples, the selecting of the second size for the data chunk is performed before the dividing of the data chunk into the first number of data segments. That is, in some examples, first a data chunk size can be determined, and then the data chunk is divided into segments.

After operation 904, process flow 900 moves to operation 906.

Operation 906 depicts dividing a data chunk of the data chunks into a number of data segments. In some examples, these data segments can be data 1 604A, data 2 604B, and data 8 604C of FIG. 6.

After operation 906, process flow 900 moves to operation 908.

Operation 908 depicts dividing respective data segments of the number of data segments into respective stripes. In some examples, the respective stripes can be stripe EC unit 808A, stripe EC unit 808B, stripe EC unit 808C, and stripe EC unit 808N of FIG. 8.

After operation 908, process flow 900 moves to operation 910.

Operation 910 depicts writing a first portion of data of the data object to first stripes of the respective stripes. This can comprise writing data to stripe EC unit 808A of FIG. 8.

After operation 910, process flow 900 moves to operation 912.

Operation 912 depicts after writing the first portion of data of the data object to the first stripes, and independently of writing a second portion of data of the data object to second stripes of the respective stripes, determining erasure coding values, and writing respective erasure coding values of the erasure coding values to respective erasure coding stripes that are separate from the respective stripes. That is, once data for a stripe is written, EC values for that stripe can be determined, and this can be done without regard to other data being written to other stripes of a chunk.

Using the example of FIG. 8, data in stripe EC unit 808A can be written (e.g., data in a portion of stripe EC unit 808A that corresponds to data 1 804A, data 2 804B, and data 8 804C). Once that is complete, the corresponding EC values can be determined (e.g., EC values for code 1 806A and code 4 806B). Determining EC values for this stripe can begin even though data for the object is still being written to other stripes (e.g., stripe EC unit 808B, stripe EC unit 808C, and stripe EC unit 808N).

In some examples, the number of data segments is eight, and the writing of the respective erasure coding values comprises writing the respective erasure coding values to four erasure coding stripes. That is, an 8+4 EC scheme can be implemented.

After operation 912, process flow 900 moves to operation 914.

Operation 914 depicts storing the data chunk. Once the data chunk has been written, it can be stored in storage 110 of FIG. 1. In some examples, the data chunk is stored as it is written and there is not a separate operation of storing the data chunk.

In some examples, the data object is a first data object, the data chunk is configured to store at least part of the first data object, and the first data object is configured to exclude storage of a second data object. That is, with type-III chunks, it can be that one type-III chunk stores only one data object.

In some examples the data object is a first data object, and operation 914 comprises determining that the data chunk is able to be garbage collected in response to the first data object being deleted, and independently of a second data object being deleted. That is, where a data chunk stores only one object, it can be garbage collected when that one object is deleted, rather than implementing a more-detailed garbage collection process.

After operation 914, process flow 900 moves to 916, where process flow 900 ends.

FIG. 10 illustrates an example process flow 1000 that can facilitate variable sized data chunks with striped erasure coding, in accordance with an embodiment of this disclosure. In some examples, one or more embodiments of process flow 1000 can be implemented by variable sized data chunks with striped erasure coding component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9 and/or process flow 1100 of FIG. 11.

Process flow 1000 begins with 1002, and moves to operation 1004.

Operation 1004 depicts dividing a data chunk into a number of data segments. In some examples, operation 1004 can be implemented in a similar manner as operation 906 of FIG. 9.

After operation 1004, process flow 1000 moves to operation 1006.

Operation 1006 depicts dividing respective data segments of the number of data segments into respective stripes. In some examples, operation 1006 can be implemented in a similar manner as operation 908 of FIG. 9.

In some examples, the respective stripes have a same size. That is stripes can be of a uniform size.

After operation 1006, process flow 1000 moves to operation 1008.

Operation 1008 depicts writing a first portion of data of a data object to first stripes of the respective stripes. In some examples, operation 1008 can be implemented in a similar manner as operation 910 of FIG. 9.

In some examples, the respective stripes within the respective data segments have an order, and the writing of the first portion of data of the data object to the first stripes of the respective stripes comprises writing to the respective stripes in the order. That is, there can be an order to the stripes. Using the example of FIG. 8, data can first be written to stripe EC unit 804A, then to stripe EC unit 804B, then to stripe EC unit 804C, etc.

In some examples, operation 1008 comprises determining to write the first portion of the data to the data chunk, via the writing of the first portion of data of the data object to the first stripes, in response to determining that a first size of the data object satisfies at least a threshold size criterion relative to a second size of the first stripes. That is, type-III chunks can be used in conjunction with other chunks in a storage system. In some examples, a data object can be written to a type-III chunk when the object is big enough. An object can be big enough when it is determined to be within a threshold amount of the size of one stripe EC unit.

In some examples, the data object is a first data object, the data chunk is a first data chunk, the first data chunk is able to store at most one data object, and operation 1008 comprises determining to write a second data object to a second data chunk in response to determining that a third size of the second data object fails to satisfy the threshold size criterion relative to the second size of the first stripes, and the second data chunk is able to store multiple data objects. That is, it can be that a data object is determined to be too small to write to a type-III chunk, so it can be written to a different type of data chunk, such as a type-I data chunk.

After operation 1008, process flow 1000 moves to operation 1010.

Operation 1010 depicts, after writing the first portion of data of the data object to the first stripes of the respective stripes, and independently of writing a second portion of data of the data object to second stripes of the respective stripes, determining erasure coding values, and writing respective erasure coding values of the erasure coding values to respective erasure coding stripes. In some examples, operation 1010 can be implemented in a similar manner as operation 912 of FIG. 9.

In some examples, the writing of the first portion of data of the data object, the writing of the second portion of data of the data object, and the writing of the respective erasure coding values comprises writing according an append-only write policy to data chunks. That is, the present techniques can be implemented on a storage system that implements an append-only write policy to data chunks.

In some examples, operation 1010 comprises freeing disk blocks that correspond to the data object after deleting the data object. In some examples, the freeing is performed independently of a garbage collection process that garbage collects with respect to data objects of the system. That is, it can be that disk blocks can be freed immediately after deleting the object, and no extra garbage collection (GC) flow is necessary.

After operation 1010, process flow 1000 moves to 1012, where process flow 1000 ends.

FIG. 11 illustrates an example process flow 1100 that can facilitate variable sized data chunks with striped erasure coding, in accordance with an embodiment of this disclosure. In some examples, one or more embodiments of process flow 1100 can be implemented by variable sized data chunks with striped erasure coding component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1000 of FIG. 10.

Process flow 1100 begins with 1102, and moves to operation 1104.

Operation 1104 depicts dividing a data chunk into data segments. In some examples, operation 1104 can be implemented in a similar manner as operation 906 of FIG. 9.

After operation 1104, process flow 1100 moves to operation 1106.

Operation 1106 depicts dividing the data segments into respective stripes. In some examples, operation 1106 can be implemented in a similar manner as operation 908 of FIG. 9.

After operation 1106, process flow 1100 moves to operation 1108.

Operation 1108 depicts, after writing a first portion of data of a data object to first stripes of the respective stripes, and independently of writing a second portion of data of the data object to second stripes of the respective stripes, determining erasure coding values, and writing the erasure coding values to respective erasure coding stripes. In some examples, operation 1108 can be implemented in a similar manner as operations 910-912 of FIG. 9.

In some examples, the first stripes are stored on respective different physical disks. In some examples, the writing of the first portion of data of the data object to the first stripes of the respective stripes comprises writing the first portion of data to the first stripes in parallel. In some examples, operation 1108 comprises reading the data object from the respective different physical disks in parallel. That is, it can be that different stripes are distributed on different physical disks. With this arrangement, data can be written and read in parallel from physical disks, which can improve a speed of object input/output (I/O) relative to non-parallel implementations.

In some examples, the data chunk is a first data chunk, and operation 1108 comprises, in response to determining that a first size of the data chunk fails to satisfy a threshold size criterion relative to a second size of the first stripes, writing the data chunk to a second data chunk, where the second data chunk is configured to store multiple data objects. That is, it can be that a data object is determined to be too small to write to a type-III chunk, so it can be written to a different type of data chunk, such as a type-I data chunk.

After operation 1108, process flow 1100 moves to operation 1110, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of server 102 and/or client computer 106 of FIG. 1.

In some examples, computing environment 1200 can implement one or more embodiments of the process flows of FIGS. 9-11 to facilitate variable sized data chunks with striped erasure coding.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the processor, comprising instructions that cause the at least one processor to perform operations comprising:
      determining to write a data object to a storage system that implements an append-only write policy to data chunks;
      dividing a first data chunk of the data chunks into a number of data segments;
      dividing respective data segments of the number of data segments into respective stripes, wherein the first data chunk comprises multiple stripes of the respective stripes; and
      writing a first portion of data of the data object to first stripes of the respective stripes;
      after writing the first portion of data of the data object to the first stripes, and independently of writing a second portion of data of the data object to second stripes of the respective stripes,
         determining erasure coding values, and
         writing respective erasure coding values of the erasure coding values to respective erasure coding stripes that are separate from the respective stripes;
      storing the first data chunk; and
      based on determining that there is a tail portion of the data object that has a tail size that is smaller than a stripe size of the stripes, writing the tail portion of the data object to a second data chunk, wherein the first data chunk is configured to store data of one data object, and wherein the second data chunk is configured to store data of multiple data objects.

2. The system of claim 1, wherein respective data chunks of the data chunks have non-uniform sizes.

3. The system of claim 2, wherein the number of data segments is a first number, and wherein the operations further comprise:
   selecting a second number of the respective stripes based on a first size of the data object; and
   selecting a second size for the first data chunk based on the second number of the respective stripes and a third size of the respective stripes.

4. The system of claim 3, wherein the selecting of the second size for the first data chunk is performed before the dividing of the first data chunk into the first number of data segments.

5. The system of claim 1, wherein the data object is a first data object, wherein the first data chunk is configured to store at least part of the first data object, and wherein the first data object is configured to exclude storage of a second data object.

6. The system of claim 1, wherein the data object is a first data object, and wherein the operations further comprise:
determining that the first data chunk is able to be garbage collected in response to the first data object being deleted, and independently of a second data object being deleted.

7. The system of claim 1, wherein the number of data segments is eight, and wherein the writing of the respective erasure coding values comprises writing the respective erasure coding values to four erasure coding stripes.

8. A method, comprising:
dividing, by a system comprising at least one processor, a first data chunk into a number of data segments;
dividing, by the system, respective data segments of the number of data segments into respective stripes, wherein the first data chunk comprises multiple stripes of the respective stripes;
writing, by the system, a first portion of data of a data object to first stripes of the respective stripes;
after writing the first portion of data of the data object to the first stripes of the respective stripes, and independently of writing a second portion of data of the data object to second stripes of the respective stripes,
determining, by the system, erasure coding values, and
writing, by the system, respective erasure coding values of the erasure coding values to respective erasure coding stripes; and
based on determining that there is a tail portion of the data object that has a tail size that is smaller than a stripe size of the stripes, writing, by the system, the tail portion of the data object to a second data chunk, wherein the first data chunk is configured to store data of one data object, and wherein the second data chunk is configured to store data of multiple data objects.

9. The method of claim 8, wherein the writing of the first portion of data of the data object, the writing of the second portion of data of the data object, and the writing of the respective erasure coding values comprises writing according an append-only write policy to data chunks.

10. The method of claim 8, wherein the respective stripes have a same size.

11. The method of claim 8, wherein the respective stripes within the respective data segments have an order, and wherein the writing of the first portion of data of the data object to the first stripes of the respective stripes comprises writing to the respective stripes in the order.

12. The method of claim 8, further comprising:
determining, by the system, to write the first portion of the data to the first data chunk, via the writing of the first portion of data of the data object to the first stripes, in response to determining that a first size of the data object satisfies at least a threshold size criterion relative to a second size of the first stripes.

13. The method of claim 12, wherein the data object is a first data object, wherein the first data chunk is able to store at most one data object, and further comprising:
determining, by the system, to write a second data object to a third data chunk in response to determining that a third size of the second data object fails to satisfy the threshold size criterion relative to the second size of the first stripes, wherein the third data chunk is able to store multiple data objects.

14. The method of claim 8, further comprising:
freeing, by the system, disk blocks that correspond to the data object after deleting the data object.

15. The method of claim 14, wherein the freeing is performed independently of a garbage collection process that garbage collects with respect to data objects of the system.

16. A non-transitory computer-readable medium comprising instructions that, in response to execution, cause a system comprising at least one processor to perform operations, comprising:
dividing a first data chunk into data segments;
dividing the data segments into respective stripes;
after writing a first portion of data of a data object to first stripes of the respective stripes, and independently of writing a second portion of data of the data object to second stripes of the respective stripes,
determining erasure coding values, and
writing the erasure coding values to respective erasure coding stripes; and
based on determining that there is a tail portion of the data object that has a tail size that is smaller than a stripe size of the stripes, writing the tail portion of the data object to a second data chunk, wherein the first data chunk is configured to store data of one data object, and wherein the second data chunk is configured to store data of multiple data objects.

17. The non-transitory computer-readable medium of claim 16, wherein the first stripes are stored on respective different physical disks.

18. The non-transitory computer-readable medium of claim 17, wherein the writing of the first portion of data of the data object to the first stripes of the respective stripes comprises writing the first portion of data to the first stripes in parallel.

19. The non-transitory computer-readable medium of claim 17, wherein the operations further comprise:
reading the data object from the respective different physical disks in parallel.

20. The non-transitory computer-readable medium of claim 16, wherein the operations further comprise:
in response to determining that a first size of the first data chunk fails to satisfy a threshold size criterion relative to a second size of the first stripes, writing the first data chunk to a third data chunk, wherein the third data chunk is configured to store multiple data objects.

* * * * *